United States Patent [19]
Sato

[11] Patent Number: 5,668,808
[45] Date of Patent: Sep. 16, 1997

[54] PATH ROUTE RETRIEVAL METHOD IN A TIME MULTIPLEXER NETWORK

[75] Inventor: Naoko Sato, Tokyo, Japan

[73] Assignee: NEC Corporation, Tokyo, Japan

[21] Appl. No.: 653,778

[22] Filed: May 28, 1996

[30] Foreign Application Priority Data

May 25, 1995 [JP] Japan .................. 7-126376

[51] Int. Cl.⁶ .............. H04J 1/16; H04L 1/00; H04B 3/38
[52] U.S. Cl. .............. 370/378; 370/217; 370/219; 370/221; 340/825.01
[58] Field of Search .............. 370/58.1, 58.2, 370/58.3, 66, 112, 217–219, 221, 225–228, 378; 340/825.01, 827

[56] References Cited

U.S. PATENT DOCUMENTS

| | | | |
|---|---|---|---|
| 3,961,140 | 6/1976 | Carbrey | 179/15 |
| 4,327,436 | 4/1982 | Ohara et al. | 370/110.1 |
| 4,592,049 | 5/1986 | Killat et al. | 370/87 |
| 4,993,024 | 2/1991 | Quinquis et al. | 370/94.1 |
| 5,528,584 | 6/1996 | Grant et al. | 370/58.2 |

FOREIGN PATENT DOCUMENTS

| | | |
|---|---|---|
| 3-38132 | 2/1991 | Japan . |
| 4-152735 | 5/1992 | Japan . |
| 4-337942 | 11/1992 | Japan . |

*Primary Examiner*—Douglas W. Olms
*Assistant Examiner*—A. Bnimoussa
*Attorney, Agent, or Firm*—Sughrue, Mion, Zinn, Macpeak & Seas

[57] ABSTRACT

Transmission line interfaces 300 and 400, terminal interfaces 100 and 200 and a time switch (TSW) 500 are controlled by a controller 600'. The controller 600' includes a communication means circuit 70 for communication with the controllers of other stations, a TS allotment data memory 80 accommodating ID number data provided corresponding to each path in TS allotment data describing the allotment of specific time slots (TS) to transmission lines 30 and 40, a route data table 60 accommodating route data constituted by data sets of the station numbers and ID numbers of stations until reaching of an end station for each ID number path, and route data updating means (not shown) for updating route data. Working path data can be obtained with reference to the route data.

3 Claims, 4 Drawing Sheets

FIG.2

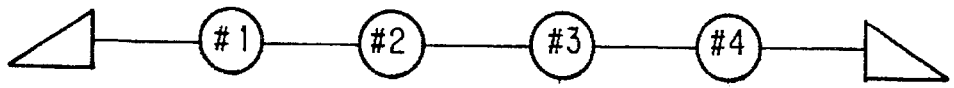

NODE #1 ROUTE DATA MEMORY A

| ID | ONN | ONN | ONN |
|---|---|---|---|
| : | : | : | : |
| 1 | TERMINATION | | |
| : | : | : | : |

NODE #1 ROUTE DATA MEMORY B

| ID | ONN | ONN | ONN |
|---|---|---|---|
| : | : | : | : |
| 1 | #2,2 | #3,3 | #4,4 |
| : | : | : | : |

NODE #2 ROUTE DATA MEMORY A

| ID | ONN | ONN | ONN |
|---|---|---|---|
| : | : | : | : |
| 2 | #1,1 | NONE | NONE |
| : | : | : | : |

NODE #2 ROUTE DATA MEMORY B

| ID | ONN | ONN | ONN |
|---|---|---|---|
| : | : | : | : |
| 2 | #3,3 | #4,4 | NONE |
| : | : | : | : |

NODE #3 ROUTE DATA MEMORY A

| ID | ONN | ONN | ONN |
|---|---|---|---|
| : | : | : | : |
| 3 | #2,2 | #1,1 | NONE |
| : | : | : | : |

NODE #3 ROUTE DATA MEMORY B

| ID | ONN | ONN | ONN |
|---|---|---|---|
| : | : | : | : |
| 3 | #4,4 | NONE | NONE |
| : | : | : | : |

NODE #4 ROUTE DATA MEMORY A

| ID | ONN | ONN | ONN |
|---|---|---|---|
| : | : | : | : |
| 4 | #3,3 | #2,2 | #1,1 |
| : | : | : | : |

NODE #4 ROUTE DATA MEMORY B

| ID | ONN | ONN | ONN |
|---|---|---|---|
| : | : | : | : |
| 4 | TERMINATION | | |
| : | : | : | : |

ONN : OPPOSITE NODE NUMBER

1 ~ #4 : NODE NUMBER    1 ~ 4 : PATH ID NUMBER

PATH ROUTE RETRIEVAL METHOD IN A TIME MULTIPLEXER NETWORK

BACKGROUND OF THE INVENTION

The present invention relates to a path route retrieval method in a time division multiplexer network in which working path (or routine) data can be obtained instantly.

FIG. 4 shows an example of prior art time division multiplexer. This time division multiplexer comprises dual system terminal interfaces 100 and 200, the dual system transmission line interfaces 300 and 400, the time switch (TSW) 500 for time slot switching, and a controller 600 for controlling and monitoring the terminal interfaces 100 and 200, transmission line interfaces 300 and 400 and a time switch 500. In addition, the multiplexer accommodates dual system transmission lines 30 and 40 through which multiplexed signals are transmitted, and terminal lines 10 and 20 connected to the respective dual system terminal units.

The controller 600 includes communication means 70 for communication with the controllers of other stations (i.e., other time division multiplexers), and a time slot (TS) allotment data memory 80 having time slot allotment data describing the allotment of specific time slots (TS) of the terminal interfaces 100 and 200 and transmission line interfaces 300 and 400 to the transmission lines 30 and 40. The controller 600 thus can read data to and from the other stations.

In this time division multiplexer, the transmission line 30 is connected to the transmission interface 300, and the transmission line 40 is connected to the transmission line interface 400. Signals having been transmitted through the transmission line 30 are delivered through the transmission line interface 300 to the time switch 500. The time switch 500 switches time slots according to a setting which has been made preliminarily in the controller 600 and delivers the signal to the separate transmission line interface 400 or the terminal interface 100 or 200 according to the setting.

The transmission line 40 is connected to the transmission line interface 400, and the signal delivered from the time switch 500 is sent out to the transmission line 40. The terminal line 10 is connected to the terminal interface 100, and the signal delivered from the time switch 500 is transmitted to the terminal line 10. The terminal line 20 is connected to the terminal interface 200, and the signal delivered from the time switch 500 is transmitted to the terminal line 20.

Where three or more time division multiplexers or stations constitute a time division multiplexer network, the time slot allotment data memory 80 in one of the three multiplexers contains information for the other stations as nodes. The stored time slot allotment data stored, which describes the transfer of data from an interface to another in the network through the time switch 500 and by the allotment of specific time slots of the terminal interfaces 100 and 200 or the transmission line interfaces 300 and 400 to the transmission lines 30 and 40. The content of the time slot allotment data includes ID (identification) number for each path. The controller 600 controls the time switch 500 according to the time slot allotment data. When necessary, the controller can also inform the other nodes of any trouble or the like using the communication means 70, according to the path data corresponding to each of the transmission lines 30 and 40. While in these time division multiplexers the individual parts are dual systems, the present invention is also applicable to three or more systems with system parts.

Where a network is formed with three or more of the above time division multiplexers, each station has its own internal data, and a monitor (not shown) which monitors the whole network is disposed for a specific station.

Each time division multiplexer has its own internal data and does not have any data concerning a path relaying route for communication with multiplexers. However, the relaying route can be changed independently of the path-terminating station. This dictates illogical communication that it is possible to obtain path data only from the monitor when making route retrieval from a station not having any monitor or route retrieval from a particular relaying station.

Therefore, too long of a time period lapses when making a survey of possible paths bypassing a trouble spot in the network in spite of the fact that these operations should be done nearly instantaneously.

As techniques related to the bypassing measure in time division multiplexers, a relaying line selection system is disclosed in Japanese Laid-Open Patent Publication No. 3-38132, a bypassing retrieval system is disclosed in Japanese Laid-Open Patent Publication No. 4-152735, and a bypassing route setting system is disclosed in Japanese Laid-Open Patent Publication No. 4-337942. In the disclosed bypassing route setting system, although data of routes to adjacent nodes are provided, these data are link unit data in such bypassing route setting. Therefore, the system cannot be directly applied to the route retrieval of working path data in time division multiplexers.

SUMMARY OF THE INVENTION

An object of the present invention is therefore to provide a path route retrieval method in a time division multiplexer network, which permits near near instantaneous acquisition of working path data, and a time division multiplexer which can be used to carry out the same method.

According to the present invention, there is provided a path route retrieval method in a time division multiplexer network including three or more stations including respective time division multiplexers and a plurality of transmission lines, in which time slot allotment is executed based on time slot allotment data describing the allotment of specific time slot to one of the plurality of transmission lines, the time division multiplexers each being capable of obtaining working path data on the basis of ID number data provided for each path and having renewable route data including a data set for opposite station numbers and path ID number to the opposite station until reaching an end stations for each path ID number, the working path data being obtained with reference to the route data.

According to the present invention, there is also provided a time division multiplexer comprising a plurality of transmission line interfaces, a plurality of terminal interfaces, a time switch, and a controller for controlling the interfaces and time switch, the controller including a time slot allotment data memory accommodating ID number data provided for each path in time slot allotment data describing the allotment of specific time slots to one of the plurality of transmission lines, the controller having a route data table accommodating route data of a data set including, for each ID number, the opposite station numbers and ID number of the opposite stations until reaching an end station, the working path data being obtainable with reference to the route data.

The controller includes communication means for communication with the controllers of other time division multiplexers and route data updating means for updating the route data in the route data table in the communication of the communication means with other stations.

Other objects and features will clarified from the following description of a preferred embodiment with reference to attached drawings.

BRIEF DESCRIPTION OF THE DRAWINGS

FIG. 2 is for illustrating the path route retrieval in the network configuration constituted by the controller 600' in the time division multiplexer;

DETAILED DESCRIPTION OF PREFERRED EMBODIMENTS

A path route retrieval method in a time division multiplexer network and a time division multiplexer according to the present invention will now be described in conjunction with an embodiment thereof with reference to the drawings.

First, the path route retrieval method in a time division multiplexer network according to the present invention will be briefly described. This path route retrieval method is applied to a network having three or more stations and a plurality of transmission lines. The time division multiplexers in the network can each obtain working path data according to ID number data provided for each path. Time slot are allotted on the basis of time slot allotment data describing the allotment of a specific time slot to one of the plurality of transmission lines. Each time division multiplexer has route data, which includes data sets for each of the station numbers and ID numbers of paths of each station until reaching an end station for each ID number path. The working path data can be obtained with reference to this route data. By executing the path route retrieval with reference to the route data, working path data can be obtained instantly even from any intermediate relaying station in the path in a time division multiplexer without a network constitution monitor.

Figure 1:
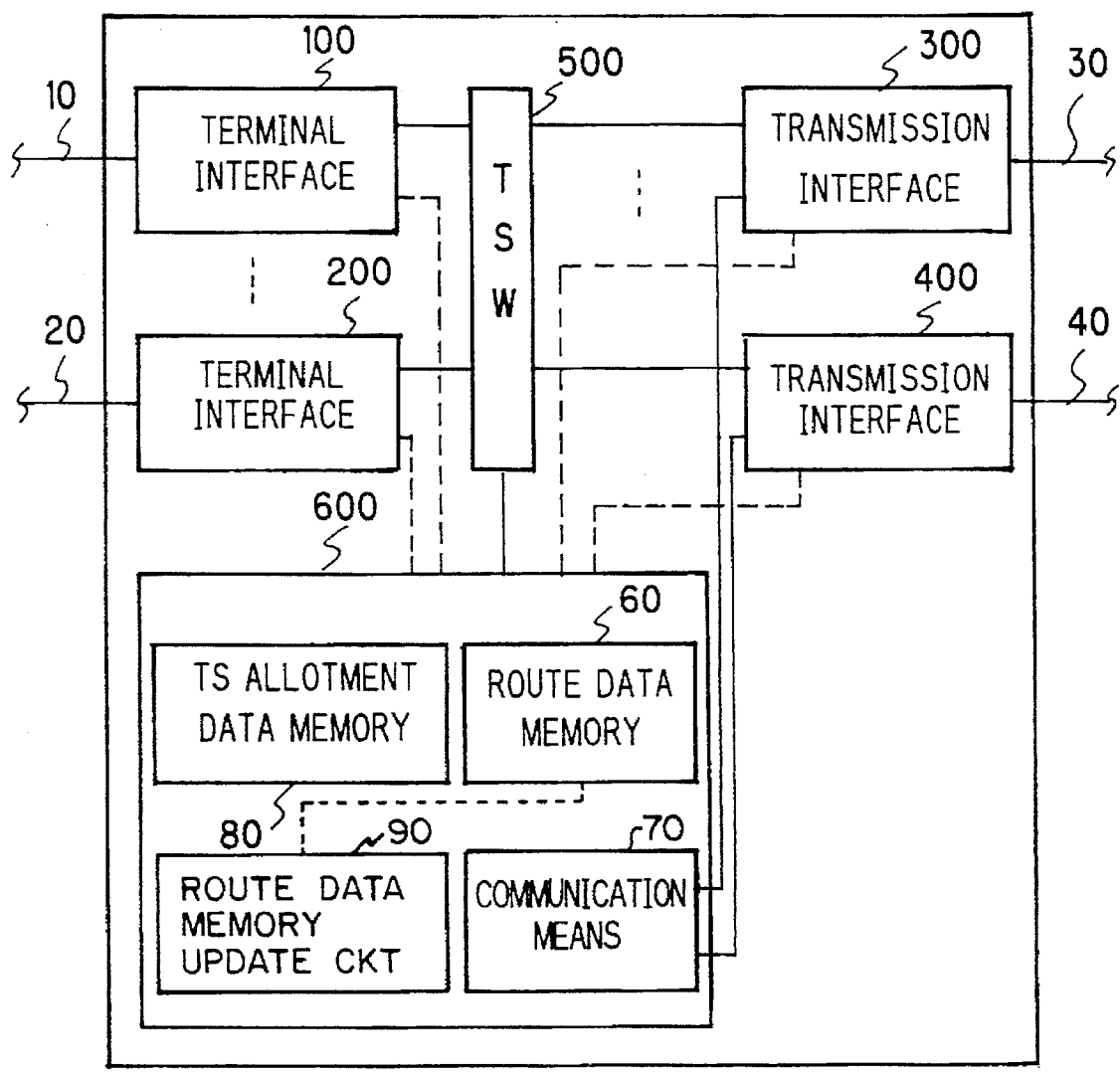
FIG. 1 is a block diagram showing the basic structure of a time division mutliplexer applied to the path route retrieval method in the time division multiplexer network.
Figure 4:
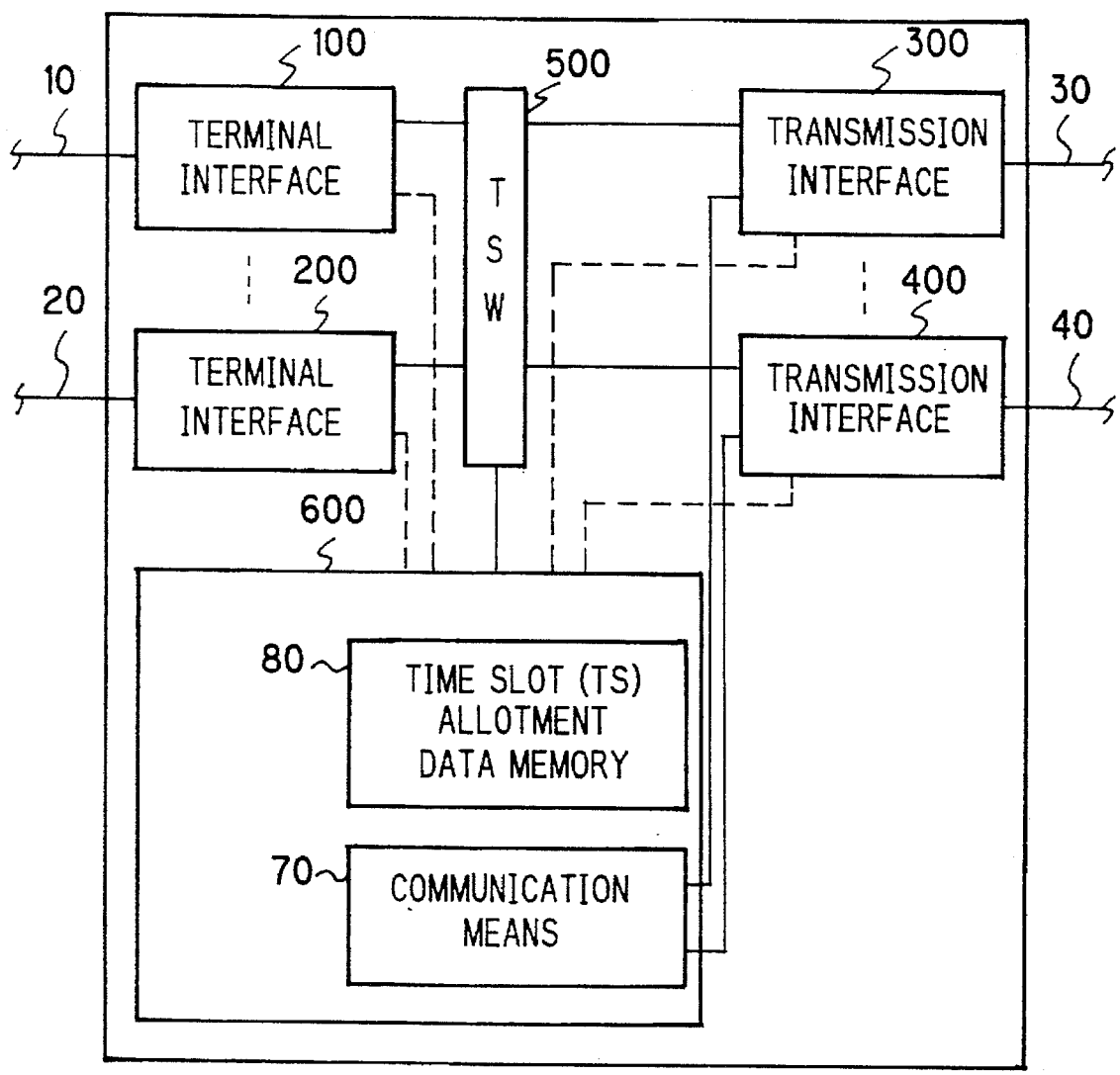
FIG. 4 shows an example of conventional time division multiplexer.

FIG. 1 is a block diagram showing the basic structure of a time division mutliplexer applied to the path route retrieval method in the time division multiplexer network. The network is constituted by three or more of such time division multiplexers. These time division multiplexers have parts similar to those described in the conventional time division multiplexer shown in FIG. 4, and the like parts, designated by like reference numerals, will not be described.

The time division multiplexer of the present the prior art one, comprises transmission line interfaces 300 and 400 including transmission lines 30 and 40, respectively, terminal interfaces 100 and 200 including terminal lines 10 and 20, respectively, a time switch (TSW) 500, and a controller 600' for controlling these parts. The controller 600' comprises communication means 70 for communication with the controllers of other time division multiplexers and a time slot allotment data memory 80. The TS memory stores ID number data provided for each path as time slot allotment data describing the allotment of specific time slots to the transmission lines 30 and 40. The controller 600' further comprises a route data table 60, in which are stored route data including data sets of each station numbers station until reaching of an end station for each ID number path and the ID number to the opposite stations. The controller also includes a route data memory data updater 90 for updating the route data in the route data table 60 in communication with other stations by the communication means 70. The controller 600' can obtain the working path data with reference to the route data.

FIG. 2 illustrates path route retrieval in the network configuration including the controller 600' in the time division multiplexer. Route data are stored in the route data table 60 of the controller 600' in the time division multiplexer. In the route data, the opposite station is the data corresponding to the location of the opposite node location, and the ID number in the opposite station is the ID number of the path in the opposite node.

Where path setting is made between two high speed lines in the network configuration, two route data tables are provided for a single ID number. Specifically, when data communication is made between, for instance, a terminal connected to station #1 and a terminal connected to station #2, as shown in FIG. 2, each terminal effects data transmission via path ID1 in the station #1, path ID2 in the station #2, path ID3 in the station #3 and path ID4 in the station #4. In this case, as route data table in each station, the stations #2 and #3 each have two route data tables, i.e., the route data tables A and B, for path setting between two high speed lines.

With such route data tables, a path-terminating station or relaying station can instantly obtain the working path data. In addition, with the provision of the communication means 70 for communication with other stations, when the connection state is updated, new route data is informed to each station, whereby the route data updating means in the controller 600' in each station updates the contents in the route data table 60, thus permitting path route retrieval independently of the status of the network configuration.

Figure 3:
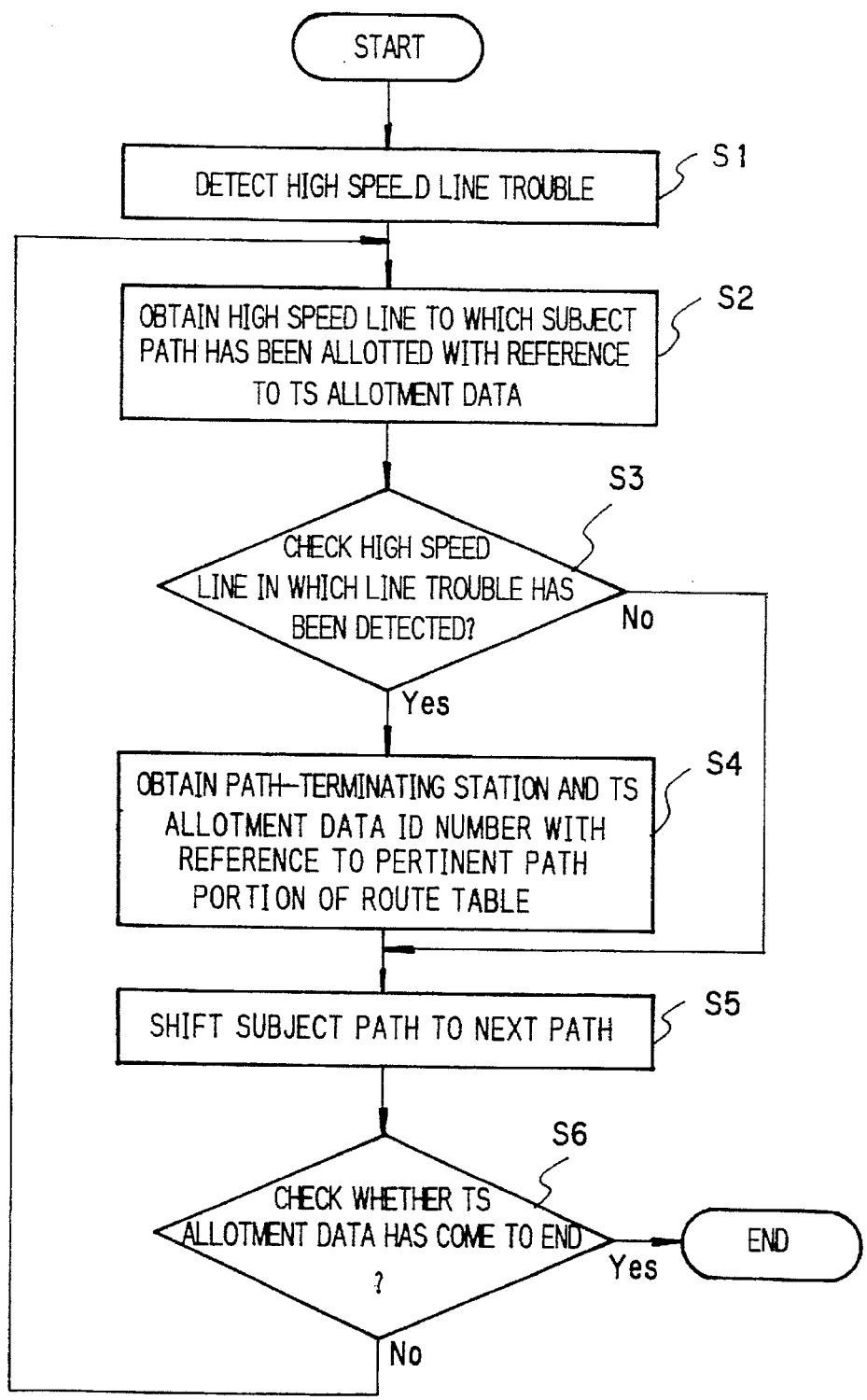
FIG. 3 is a flow chart illustrating the procedure to obtain data concerning the status, e.g. a line trouble in the network configuration of the time division multiplexer system, by utilizing the route data table 60 in the controller 600'.

FIG. 3 is a flow chart illustrating the procedure to obtain data concerning status, i.e., a line problem in the network configuration of the time division multiplexer network. This status is obtained by utilizing the route data table 60 in the controller 600'. A case is assumed here that a high speed line accommodated in a specific station is disconnected.

First, the controller 600' executes a highspeed line trouble detecting process (step S1). Then, it obtains the high speed line number, to which the subject path has been allotted, by obtaining the high speed line number with reference to the time slot allotment data stored in the time slot allotment data memory 80 (step S2).

Then, the controller 600' checks whether the high speed line indicated is one in which the line trouble has been detected (step S3). If the detected line trouble is in the indicated high speed line, the controller 600' obtains the corresponding path-terminating stations and time slot allotment data ID number in these stations with reference to a pertinent path portion of the route data table 60 (step S4). Subsequently, as in the case when the path in trouble has not been allotted to the indicated high speed line, the subject path is shifted to the next path (step S5), and a check is made as to whether the time slot allotment data has come to the end (step S6). If the data has come to the end, an end is brought to the process. Otherwise, the routine returns to the step S2 of obtaining the data of the high speed line with the subject path having been allotted thereto or the data about which high speed line is allotted to the subject path, with reference to the time slot reference data. In the above manner, it is possible to obtain trouble influence scope data for all the paths registered in the time slot allotment data, so that it is possible to obtain data of the paths influenced by the disconnection of a specific high speed line and the stations where these paths terminate.

In the event of occurrence of trouble in a high speed line, when path-terminating station data is obtained, the path-terminating station may be directly informed of the path trouble informed to the path-terminating station above routine procedure. While the time division multiplexer considered in the above routine has been assumed to comprise dual parts, the present invention is applicable to the case of multiplexers comprising three or more system ports.

As has been described in the foregoing, with the path routine retrieval method in a time division multiplexer network and the time division multiplexer used in the method according to the invention, working path data can be obtained instantly even in a path-terminating station or any intermediate relaying station in the path for network configuration. Thus, in the event of occurrence of trouble in a high speed line, the resultant status can be quickly obtained.

Changes in construction will occur to those skilled in the art and various modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A path route retrieval method in a time division multiplexer network including three or more stations, each station including respective time division multiplexers and a plurality of transmission lines, in which time slot allotment is executed based on time slot allotment data describing the allotment of specific time slot to one of the plurality of transmission lines, the time division multiplexers each being capable of obtaining working path data on the basis of ID number data for each path and each multiplexer having renewable route data including, for each path ID number, opposite station numbers and the path ID number of the opposite stations until reaching an end station, the working path data being obtained with reference to the route data.

2. A time division multiplexer comprising a plurality of transmission line interfaces, a plurality of terminal interfaces, a time switch, and a controller for controlling the interfaces and time switch, the controller including a time slot allotment data memory for accommodating ID number data for each path in time slot allotment data and for describing the allotment of specific time slots to one of the plurality of transmission lines, the controller further including a route data table accommodating route data including, for each ID number, opposite station numbers and the path ID number of the opposite stations until reaching an end station, the working path data being obtainable with reference to the route data.

3. The time division multiplexer according to claim 2, wherein the controller further includes communication means for communication with the controllers of other time division multiplexers and a route data updater for updating the route data in the route data table in the communication of the communication means with other stations.

* * * * *